United States Patent [19]
Doucet

[11] Patent Number: 5,157,401
[45] Date of Patent: Oct. 20, 1992

[54] JOG DETECTOR
[75] Inventor: Keith R. Doucet, Kanata, Canada
[73] Assignee: Her Majesty Queen Minister of National Defence Canadian Government, Ottawa, Canada
[21] Appl. No.: 789,039
[22] Filed: Nov. 7, 1991
[51] Int. Cl.$^5$ ............................. G01S 7/38; H04K 3/00
[52] U.S. Cl. ........................................ 342/14; 342/15; 342/21
[58] Field of Search ..................... 342/13, 14, 15, 21, 342/59, 89

[56] References Cited

U.S. PATENT DOCUMENTS

| | | | |
|---|---|---|---|
| 3,618,096 | 11/1971 | Schoneborn | 342/14 |
| 3,922,676 | 11/1975 | O'Berry et al. | 342/13 |
| 4,126,862 | 11/1978 | Simonaire | 342/14 |
| 4,538,152 | 8/1985 | Wirth | 342/158 |
| 4,649,392 | 3/1987 | Apostolos | 342/192 |
| 4,700,191 | 10/1987 | Manor | 342/13 |
| 5,045,857 | 9/1991 | Hills | 342/374 |

*Primary Examiner*—John B. Sotomayor
*Attorney, Agent, or Firm*—Nixon & Vanderhye

[57] ABSTRACT

A shipborne Electric Countermeasures (ECM) system protects ships against an approaching missile by transmitting electromagnetic jamming signals directly at the missile's radar in order to disturb its range and angle tracking system sufficiently to prevent the missile from intercepting the ship. Various jamming techniques are transmitted until one is found that causes an angle deflection or "jog" in the radar transmitting antenna of the missile. The ECM's receiver looks for a sudden drop in the strength of the radar signal transmitted by the missile's radar, which indicates that a "jog" may have occurred, in order to determine if a jamming technique is effective. Multipath disturbances due to forward scattering interference also cause drops in the strength of a received radar signal but these types of signal fluctuations are a height dependent phenomenon. This ECM system diferentiates between multipath disturbances and actual "jog" by using a receiving antenna array with a number of antennas located at different heights. The vertically separated antenna measures drops in signal strength at different times if these drops are caused by multipath disturbances. However, any drops in signal strength caused by a "jog" reach all the antennas at the same time and are measured simultaneously providing an indication that a "jog" has occurred.

12 Claims, 1 Drawing Sheet

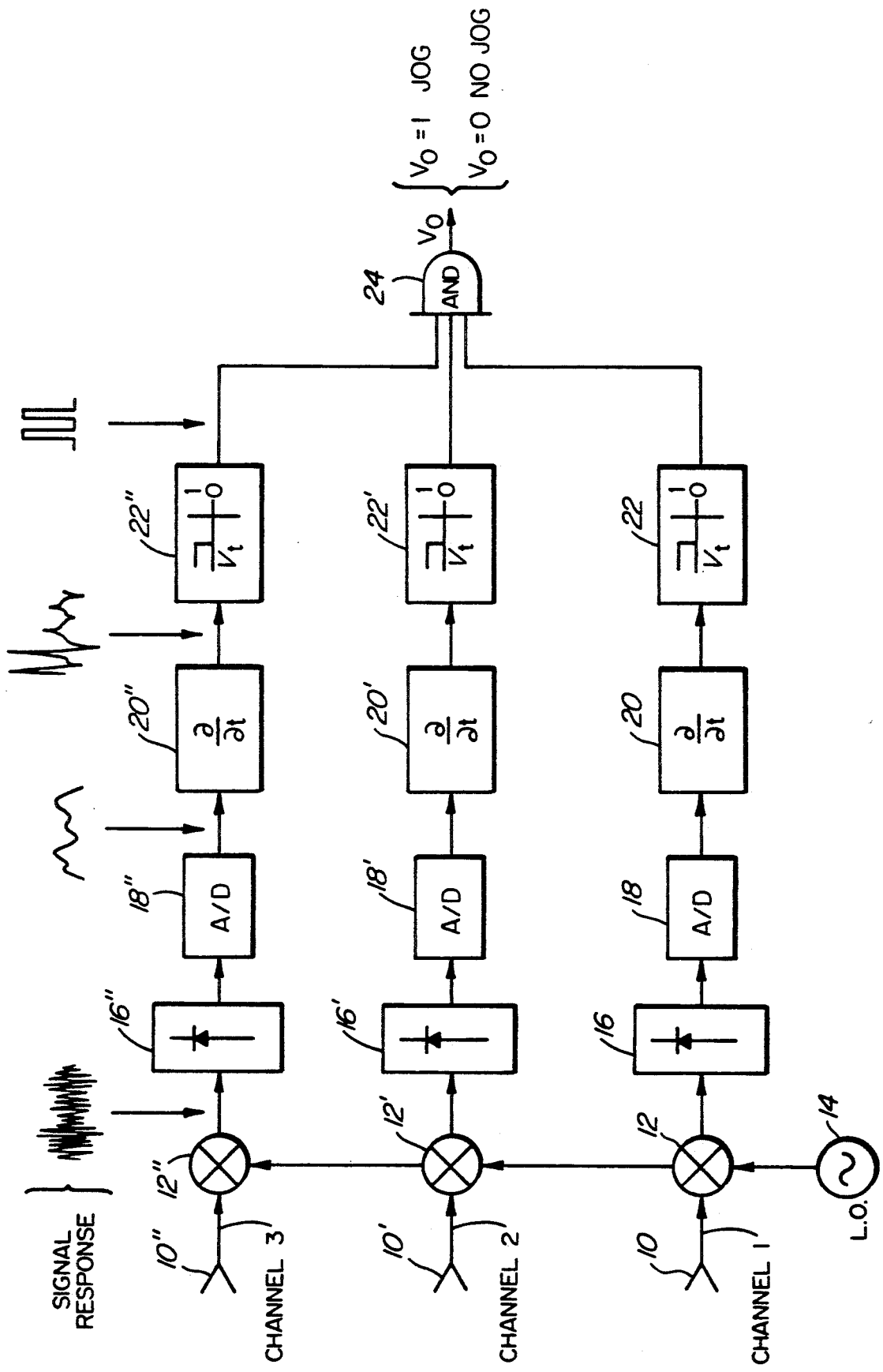

JOG DETECTOR

FIELD OF THE INVENTION

The present invention is directed generally to shipborne Electronic Countermeasures (ECM) systems of the type designed to transmit electromagnetic jamming signals directly at a radar transmitter of an approaching missile in order to disturb the missile's range and angle tracking system by an amount sufficient to prevent the missile from intercepting the ship.

BACKGROUND OF THE INVENTION

In general, these types of ECM systems attempt to sequentially apply various jamming techniques until one is hit upon which is effective in producing an angle deflection or "jog" in the radar antenna of an approaching missile's range and angle tracking system. The shipborne ECM's receiver looks for a sudden drop in the strength of a radar signal transmitted by the missile in order to detect a "jog". However, multipath disturbances caused by forward scattering interference results in signal fluctuations which can degrade the performance of a shipborne ECM system equipped with this type of jog detector. The difficulty is that multipath disturbances cause received radar signals to fluctuate in a manner similar to that expected from a "jog" resulting in false "jog" measurements being received. This degrades the jamming performance of these types of ECM systems since no reliable indication of whether an actual "jog" has taken place can be obtained.

SUMMARY OF THE INVENTION

It is an object of the invention to provide a reliable system for detecting "jogs". A jog detection system, according to the present invention, discriminates between radar signal fades caused by multipath disturbances and "jog" fades based on spatial diversity and the first-order time derivative response of received radar signals.

An ECM system, according to the present invention, is provided with a receiver having at least two vertically separated antenna wherein radar signals received by each antenna are downconverted by a mixer in separate channels for each antenna, each mixer having one input connected to an antenna and another input connected to a local oscillator with outputs from each mixer being connected to separate detectors, each detector's output being connected to a differentiator, an output of each differentiator being connected to threshold detection circuit which provides a signal output on a channel when the output from the differentiator for that channel falls below a predetermined threshold value, outputs from all the threshold detection circuits being connected to an input of an AND gate which provides an output signal only when an output signal from each threshold detection circuit exist on all channels simultaneously.

BRIEF DESCRIPTION OF THE DRAWING

The invention will now be described in more detail with reference to the accompanying drawing wherein the single figure is a block diagram that illustrates a receiver for an ECM system with circuitry to discriminate between multipath disturbances and "jog" fades according to the present invention.

DETAILED DESCRIPTION OF THE PREFERRED EMBODIMENT

The radar signal detector of an ECM system, according to the present invention, makes use of the fact that signal fades caused by maritime multipath disturbances are a height dependent phenomenon. In other words, multipath disturbances caused by forward scattering interference result in signal fluctuations that vary over different heights and these fluctuations can be measured by a receiver. This provides a basis for a receiver antenna array that can discriminate between radar signal fades caused by multipath disturbances and those caused by an angle deflection, i.e. a "jog", of a radar transmitting antenna in an approaching missile.

The figure shows one type of receiver for discriminating between signal fades caused by multipath disturbances and jogs. The ECM receiver has 3 radar signal horn receiving antenna 10, $10^1$ and $10^{11}$ which are separated vertically from each other by a distance of between 0.125 and 1 meter with the received signals from each antenna being processed in separate channels. The signals received by each antenna are downconverted to baseband by separate mixers which are supplied with a signal from a single local oscillator 14. The signal from antenna 10 is downconverted in mixer 12 and applied to a detector 16 in channel 1. Similarly, the signal from antenna $10^1$ is downconverted by mixer $12^1$ in Channel 2 before being applied to detector $16^1$ and the signal from antenna $10^{11}$ is applied to mixer $12^{11}$ whose output is then applied to detector $16^{11}$ in Channel 3. Signals from the detectors 16, $16^1$ and $16^{11}$ are processed in separate channels 1, 2 and 3 respectively.

The signals from detectors 16, $16^1$ and $16^{11}$ are first digitized by analog-to-digital (A/D) converters 18, $18^1$ and $18^{11}$ before being differentiated in differentiating circuits 20, $20^1$ and $20^{11}$ respectively. These differentiated signals will indicate when there is a change of signal strength received by an antenna in any one of the Channels 1, 2 or 3. The differentiated signals in Channels 1, 2 and 3 are applied to threshold detector circuits 22, $22^1$ and $22^{11}$ respectively which supply a logical 1 output signal in a channel when the derivative of a signal received in that channel falls below a predetermined threshold value. This creates a logical 1 at the output of a channel when a predetermined change in signal strength occurs in that channel. The outputs of the threshold circuits from all the channels are then applied to inputs of an AND gate 24 which provides a logical 1 output signal only when a logical 1 output signal appears from all the threshold detectors 22, $22^1$ and $22^{11}$ simultaneously.

When a signal received from a radar transmitter of an approaching missile drops in strength as a result of multipath interferences, each of the Channels 1, 2 or 3 will measure a signal fade at different times as the missile approaches the ship. This is a result of a receiving antenna for each of the channels being at a different height from the antenna for other channels and that signal fades caused by multipath interference are a height dependent phenomenon. Therefore, logical 1 output signals will occur in each of the channels at different times for signal fades caused by multipath disturbances which result in no output being obtained from AND gate 24. However, the three antenna 10, $10^1$ and $10^{11}$ will measure approximately the same signal fade simultaneously when a radar transmission from an approaching missile fades due to a deflection of the radar signal transmitting antenna, i.e. a "jog", caused by electronic jamming techniques created by the ECM system. This will provide a logical 1 output from AND gate 24 indicating that a "jog" has occurred and inform operators that a jamming technique then being used has been effective on that missile.

Various modifications may be made to the preferred embodiment without departing from the spirit and scope of the invention as defined in the appended claims.

The embodiments of the invention which an exclusive property or privilege is claimed are defined as follows:

1. An ECM system provided with a receiver having at least two vertically separated antenna with a directivity covering substantially the same area, wherein radar signals received by each antenna are downconverted to baseband by a mixer in separate channels for each antenna, which mixers are connected to a local oscillator, outputs from each mixer being applied to a detector with an output from each detector being connected to a differentiator whose output is connected to a threshold detection circuit that provides an output signal on a channel when an output from the differentiator for that channel changes by a predetermined value, outputs from all threshold circuits being connected to an input of an AND gate that provides an output signal only when an output signal from each threshold detection circuit exists on all the channels simultaneously.

2. An ECM system provided with a receiver having at least two vertically separated antenna with a directivity covering substantially the same are, wherein radar signals received by each antenna are downconverted to baseband by a mixer in separate channels for each antenna, which mixers are connected to a local oscillator, outputs from each mixer being applied to a detector with an output from each detector being connected to an A/D convertor whose output is connected to a differentiator, the output of each differentiator being connected to a threshold detection circuit that provides an output signal on a channel when an output from the differentiator for that channel changes by a predetermined value, outputs from all threshold circuits being connected to an input of an AND gate that provides an output signal only when an output signal from each threshold detection circuit exist on all the channels simultaneously.

3. An ECM system as defined in claim 1, wherein a single local oscillator provides a signal to an input of each mixer.

4. An ECM system as defined in claim 2, wherein a single local oscillator provides a signal to an input of each mixer.

5. An ECM system as defined in claim 3, wherein the receiver has three antenna with each antenna being separated vertically from an adjacent antenna.

6. An ECM system as defined in claim 5, wherein each antenna is separated vertically from an adjacent antenna by a distance of between 0.125 to 1 meter.

7. An ECM system as defined in claim 4, wherein the receiver has three antenna with each antenna being separated vertically from an adjacent antenna.

8. An ECM system as defined in claim 7, wherein each antenna is separated vertically from an adjacent antenna by a distance of between 0.125 to 1 meter.

9. An ECM system as defined in claim 2, wherein each antenna is separated vertically from an adjacent antenna by a distance of between 0.125 to 1 meter.

10. An ECM system as defined in claim 9, wherein the receiver has three antennas.

11. An ECM system as defined in claim 1, wherein the receiver has three vertically separated antennas.

12. An ECM system as defined in claim 11, wherein each antenna is vertically separated from an adjacent antenna by a distance of between 0.125 to 1 meter.

* * * * *